(No Model.)

J. W. CARTER.
STOPPER FOR INK OR OTHER BOTTLES.

No. 421,667. Patented Feb. 18, 1890.

WITNESSES.
J. M. Dolan
A. P. Porter

INVENTOR.
John W. Carter
by his attys
Clarke & Raymond

UNITED STATES PATENT OFFICE.

JOHN W. CARTER, OF NEWTON, MASSACHUSETTS.

STOPPER FOR INK OR OTHER BOTTLES.

SPECIFICATION forming part of Letters Patent No. 421,667, dated February 18, 1890.

Application filed December 20, 1889. Serial No. 334,435. (No model.)

*To all whom it may concern:*

Be it known that I, JOHN W. CARTER, of Newton, in the county of Middlesex and State of Massachusetts, a citizen of the United States, have invented a new and useful Improvement in Stoppers for Ink or other Bottles, of which the following is a full, clear, and exact description, reference being had to the accompanying drawings, forming a part of this specification, in explaining its nature.

The invention relates to the stopper for ink or other bottles hereinafter specified.

Figure 1:
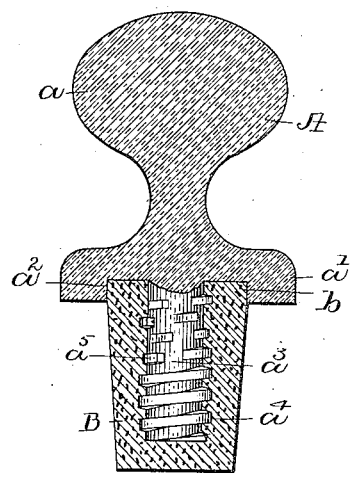
Figure 2:
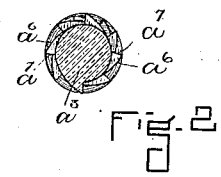
Figure 3:
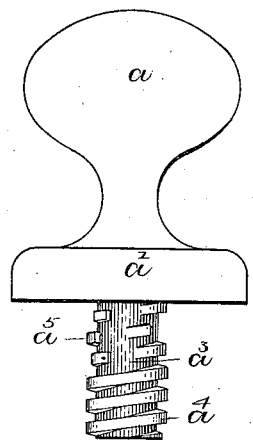
Figure 4:
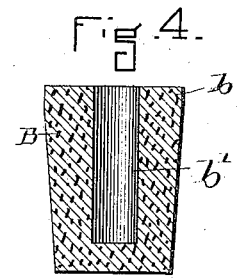

In the drawings, Figure 1 is a view in vertical central section of a stopper having the features of my invention. Fig. 2 is a section taken across the spindle on a line with the barbed teeth thereof. Fig. 3 is a view in elevation of the main section of the stopper without the spindle-covering, and Fig. 4 is a view in section of the spindle-covering.

A represents the main portion of the stopper. It is made of glass, porcelain, or other suitable material. It has the extension or end $a$, which may be of any desired shape, and which forms a thumb or other piece by which it is handled, the head or flange $a'$ having the annular depression or recess $a^2$ and the spindle $a^3$, which extends from the center of the depression or recess. The spindle preferably has its end provided with the thread $a^4$, extending about half-way or a little more than half-way the length of the spindle from its end and the teeth $a^5$, which are in the nature of barbs, and which preferably are arranged spirally upon the line of the thread of the screw, each of the teeth $a^5$ having the long tangential surface or edge $a^6$ ending in an abrupt or sharp shoulder $a^7$, extending back to the face of the spindle, the incline $a^6$ being in the direction in which the spindle would be turned for the purpose of screwing it into anything.

The stopper further consists of the section B, preferably of cork, although it may be of any other resilient material. This section B is preferably conical in shape. Its upper end $b$ is made of a size to closely fit the recess or depression $a^2$, and it has a central hole $b'$ of a size and depth to receive the spindle $a^3$. It is united to the spindle by screwing the spindle into said hole until the upper end $b$ of the section is caused to enter said depression or recess $a^2$ and to be firmly pressed against the head or flange $a'$. Cement, glue, or other adhesive substance may be placed in the depression and also in the hole of the section B to serve to further unite the said section to the head or flange $a'$ and to the spindle.

By providing the stopper with the depression $a^2$ and causing the end of the cork or spindle-covering to enter the same, and by providing the spindle with the barbed teeth, the cork or covering is very rigidly secured to the spindle, and a tight joint is formed between the upper end of the cork and the head or flange $a'$, and a fine finish is also provided. The cork or other material, being forced into the recess $a^2$ as it is applied, is firmly held by the side wall of the recess upon the teeth of the spindle.

I would say that it is not essential that the section B have its lower end solid, as the hole for the reception of the spindle may extend entirely through the same.

I would say that the section A may be made of wood or any other suitable material.

In some instances the screw-thread upon the spindle may be dispensed with and barbed or shouldered teeth substituted therefor. It is especially desirable that the spindle have teeth of the character above specified, especially near the inner end of the spindle, in order that the cork may be united to the spindle in such a way that upon a turning action of the stopper to remove the cork from the bottle the stopper cannot readily be disengaged from the cork, and as the greatest strain upon the cork is at its upper end, near the inner end of the spindle, it is especially essential that it be provided with barbed teeth at this point.

Having thus fully described my invention, I claim and desire to secure by Letters Patent of the United States—

1. In a bottle-stopper, the combination of the section A, having the projection or knob $a$, the head or flange $a'$, having the recess or depression $a^2$, and a spindle $a^3$, having a screw-thread $a^4$, and barbed or holding teeth $a^5$, with a spindle-covering section B, of cork or other similar material, provided with a hole not extending through the cork, which receives the spindle, and having its upper end held or contained in said recess or depression $a^2$, substantially as described.

2. A bottle-stopper having the section A, and the spindle $a^3$, provided with the screw-thread $a^4$ and barbed or holding teeth $a^5$, and a spindle-covering section B, of cork or other similar material, substantially as described.

3. A bottle-stopper having the section A, the head or flange $a'$, provided with a recess or depression $a^2$, a spindle $a^3$, having barbed or holding teeth $a^5$, and a spindle-covering section B, of cork or other similar material, substantially as described.

JOHN W. CARTER.

Witnesses:
F. F. RAYMOND, 2d,
J. M. DOLAN.